(12) United States Patent
Kim et al.

(10) Patent No.: US 8,904,884 B2
(45) Date of Patent: Dec. 9, 2014

(54) TORQUE SENSOR

(71) Applicant: Hyundai Motor Company, Seoul (KR)

(72) Inventors: Dong Gu Kim, Gyeonggi-do (KR); Yong Sung Lee, Gangwon-do (KR); Hi Won Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 30 days.

(21) Appl. No.: 13/770,027

(22) Filed: Feb. 19, 2013

(65) Prior Publication Data
US 2014/0144252 A1 May 29, 2014

(30) Foreign Application Priority Data
Nov. 27, 2012 (KR) .......................... 10-2012-0135169

(51) Int. Cl.
*G01L 1/22* (2006.01)
*G01L 3/02* (2006.01)

(52) U.S. Cl.
CPC .......................................... *G01L 3/02* (2013.01)
USPC ........................................................ 73/862.338

(58) Field of Classification Search
USPC ................. 73/862.338, 862.08, 777
See application file for complete search history.

(56) References Cited

U.S. PATENT DOCUMENTS

| 3,577,779 | A | * | 5/1971 | Laimins | 73/862.633 |
| 4,048,848 | A | * | 9/1977 | Dybel | 73/770 |
| 4,827,240 | A | * | 5/1989 | Hafner | 338/2 |
| 5,113,709 | A | * | 5/1992 | Ekola | 73/862.638 |
| 5,513,912 | A | * | 5/1996 | Lotz et al. | 366/349 |
| 5,648,615 | A | * | 7/1997 | Jeske et al. | 73/756 |
| 5,912,499 | A | * | 6/1999 | Diem et al. | 257/419 |
| 6,973,734 | B2 | * | 12/2005 | Raab et al. | 33/503 |

FOREIGN PATENT DOCUMENTS

| JP | H06230023 A | 8/1994 |
| KR | 10-2005-0111009 | 11/2005 |
| KR | 10-1088174 | 12/2011 |
| KR | 10-1135426 | 4/2012 |

* cited by examiner

*Primary Examiner* — Max Noori
(74) *Attorney, Agent, or Firm* — Edwards Wildman Palmer LLP; Peter F. Corless

(57) ABSTRACT

Disclosed herein is a torque sensor. The torque sensor includes a cylindrical upper case having one open end and an overload prevention member that is fixed to the upper case to prevent overload. A lower case covers the open end of the upper case and an elastic structure member is disposed on the lower case to detect deformation. Additionally, a silicon structure member is disposed on the elastic structure member to detect deformation.

2 Claims, 5 Drawing Sheets

TORQUE SENSOR

CROSS-REFERENCE TO RELATED APPLICATION

This application is based on and claims priority from Korean Patent Application No. 10-2012-0135169, filed on Nov. 27, 2012 in the Korean Intellectual Property Office, the disclosure of which is incorporated herein in its entirety by reference.

BACKGROUND OF THE INVENTION

1. Field of the Invention

The present invention relates to a torque sensor, and more particularly, to a torque sensor for improving precision when measuring force and torque.

2. Description of the Prior Art

Generally, a torque sensor is used for a wearable robot joint and a precision machining tool to measure force and torque, to perform more precise work and reduce risk factors that occur within an operating radius. As a result, a necessity for a torque sensor has increased.

Meanwhile, the force torque sensor is based on a principle of detecting deformation of an elastic structure in a sensor that occurs due to force required to measure force and torque. To detect deformation occurring in the elastic structure, a method of using a strain gauge has been developed, and a method of measuring deformation using a silicon MEMS sensor has been researched.

At present, the force torque sensor requires 10 to 20 strain gauges and calibrations for each sensor, and therefore is expensive. Recently, research has been conducted on a sensor capable of measuring force and torque in various manners to reduce sensor price without the need of a large number of strain gauges attached to a structure.

In the related art, as illustrated in FIG. 1, a method of coupling an elastic structure 10 between two shafts and detecting deformation that occurs in the elastic structure 10 due to the force generated between the shafts using several strain gauges 11 has been developed.

However, when the torque sensor according to the related art measures force and torque components based on output voltage using each strain gauge 11 configured in a bridge circuit and attached to the elastic structure 10, the torque sensor is easily manufactured, but it is difficult to precisely attach the strain gauge 11, causing a decrease in accuracy and error of about 5%.

SUMMARY

Accordingly, the present invention provides a torque sensor for improving precision when measuring force and torque.

One aspect of the present invention provides a torque sensor, including: a cylindrical upper case having one open end; an overload prevention member fixed to the upper case to prevent overload; a lower case covering the open end of the upper case; an elastic structure member disposed on the lower case to detect deformation; and a silicon structure member disposed on the elastic structure member to detect deformation.

The elastic structure member may be formed to have a circular disk shape and may include: an upper fastening portion and a lower fastening portion locked to the upper case and the lower case; a plurality of space portions formed between the upper fastening portion and the lower fastening portion in which the silicon structure is inserted; and a first deformation generation portion configured to connect between the space portions and detect the deformation of the space portions.

The silicon structure member may be formed to have a rectangular plate shape and may include: an external structure inserted into each space portion; an internal structure disposed in the external structure; a second deformation generation portion configured to connect the internal structure to the external structure to generate deformation; and a deformation sensing unit inserted into the second deformation generation portion to detect the deformation. Additionally, the deformation sensing unit may include a plurality of deformation sensing portions connected to each other.

BRIEF DESCRIPTION OF THE DRAWINGS

The above and other objects, features and advantages of the present invention will be more apparent from the following detailed description taken in conjunction with the accompanying drawings, in which.

DESCRIPTION OF EXEMPLARY EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with to reference to the accompanying drawings.

As illustrated in FIGS. 2 to 5, a torque sensor according to an exemplary embodiment of the present invention may include an upper case 100 and a lower case 120, an overload prevention member fixed to the upper case 100, an elastic structure member 130 inserted over an inner protrusion of the lower case 120 to detect deformation, and a silicon structure member 140.

Figure 1:
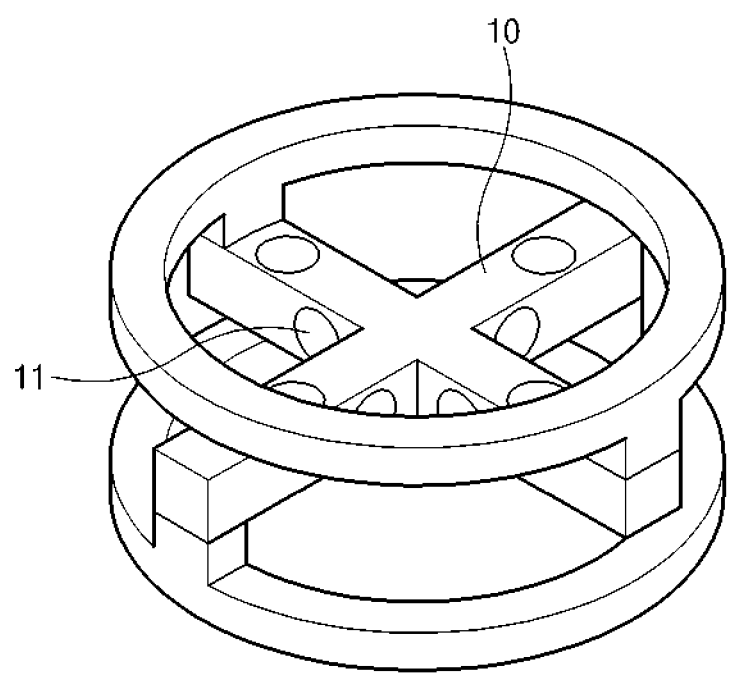
FIG. 1 is an exemplary diagram illustrating an elastic structure of a torque sensor according to the related art.
Figure 2:
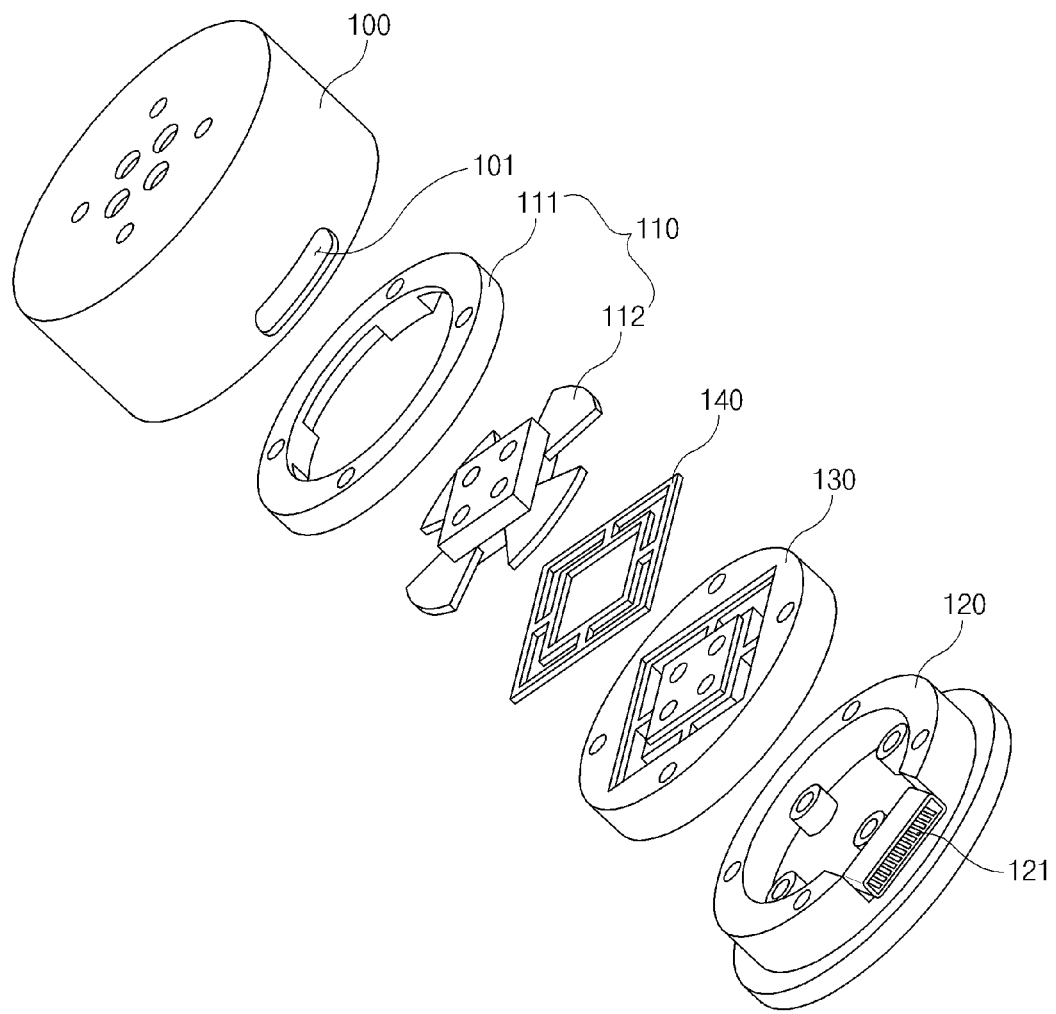
FIG. 2 is an exemplary view illustrating a torque sensor according to an exemplary embodiment of the present invention.

As illustrated in FIG. 2, the upper case 100 may have a cylinder shape of which one end is opened. An outer circumferential surface of the upper case 100 includes a connector insertion hole 101 to connect a connector 121 of the lower case 120 to be described below with the exterior of the sensor.

Furthermore, the overload prevention member 110 may be fixed to the upper case 100 to prevent overload from occurring in the torque sensor. When excessive force is applied to the torque sensor from the exterior, the elastic structure member 130, to be described below, may come in contact with the silicon structure member 140 to prevent deformation over time, thereby preventing structural damage to the torque sensor due to an overload. Additionally, the overload prevention member 110 may include a ring-shaped first member 111 and a second member 112 disposed in the first member 111 to prevent the elastic structure member 130 and the silicon structure member 140 from deforming over time.

The lower case 120 may be formed to cover an opening of the upper case 100. An outer circumferential surface of the lower case 120 may include the connector 121 configured to supply power through a power supply unit (not illustrated) disposed on the exterior of the torque sensor and may detect the deformation occurring in the elastic structure member 130 and the silicon structure member 140 and may transmit data about the detected deformation.

Figure 3:
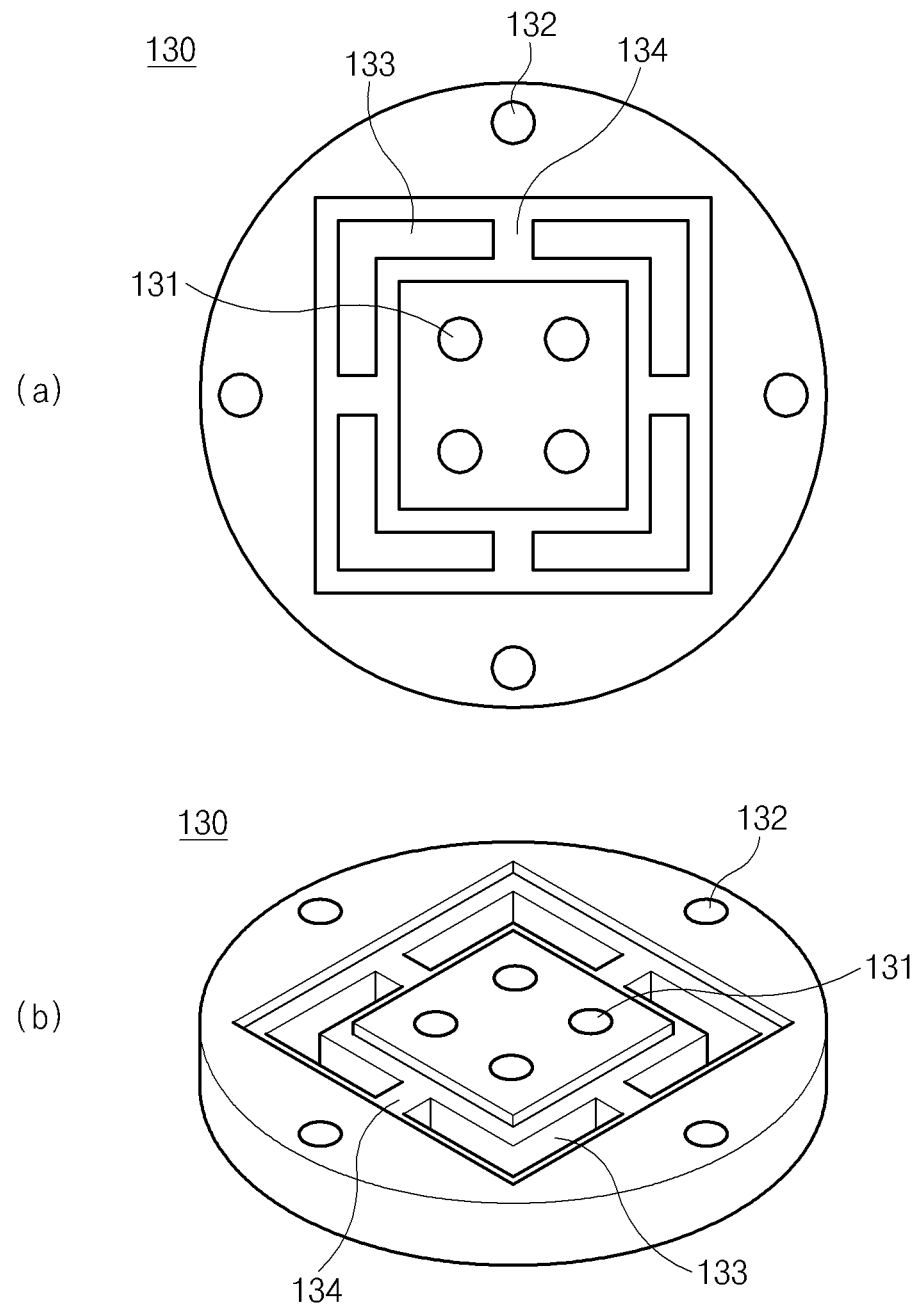
FIG. 3 is an exemplary diagram illustrating an elastic structure member of a torque sensor according to the exemplary embodiment of the present invention.

As illustrated in FIGS. 2 and 3, the elastic structure member 130 may be disposed over an inner protrusion of the lower case 120 to detect deformation within the torque sensor. The elastic structure member 130 may have a circular disk shape and may include a plurality of lower fastening portions 132 disposed on the lower case 120 at an interval of 90° along an outer diameter the disk shaped elastic structure member 130 and a central portion thereof may include a plurality of upper fastening portions 131 disposed to lock the central portion to the upper case 100.

Moreover, the elastic structure member 130 may include a plurality of rectangular space portions 133 disposed between the upper fastening portions 131 and the lower fastening portions 132, into which the silicon structure member 140 may be inserted and may include a plurality of first deformation generation portions 134 disposed between the space portions 133 and configured to detect the deformation of the space portions 133.

Figure 4:
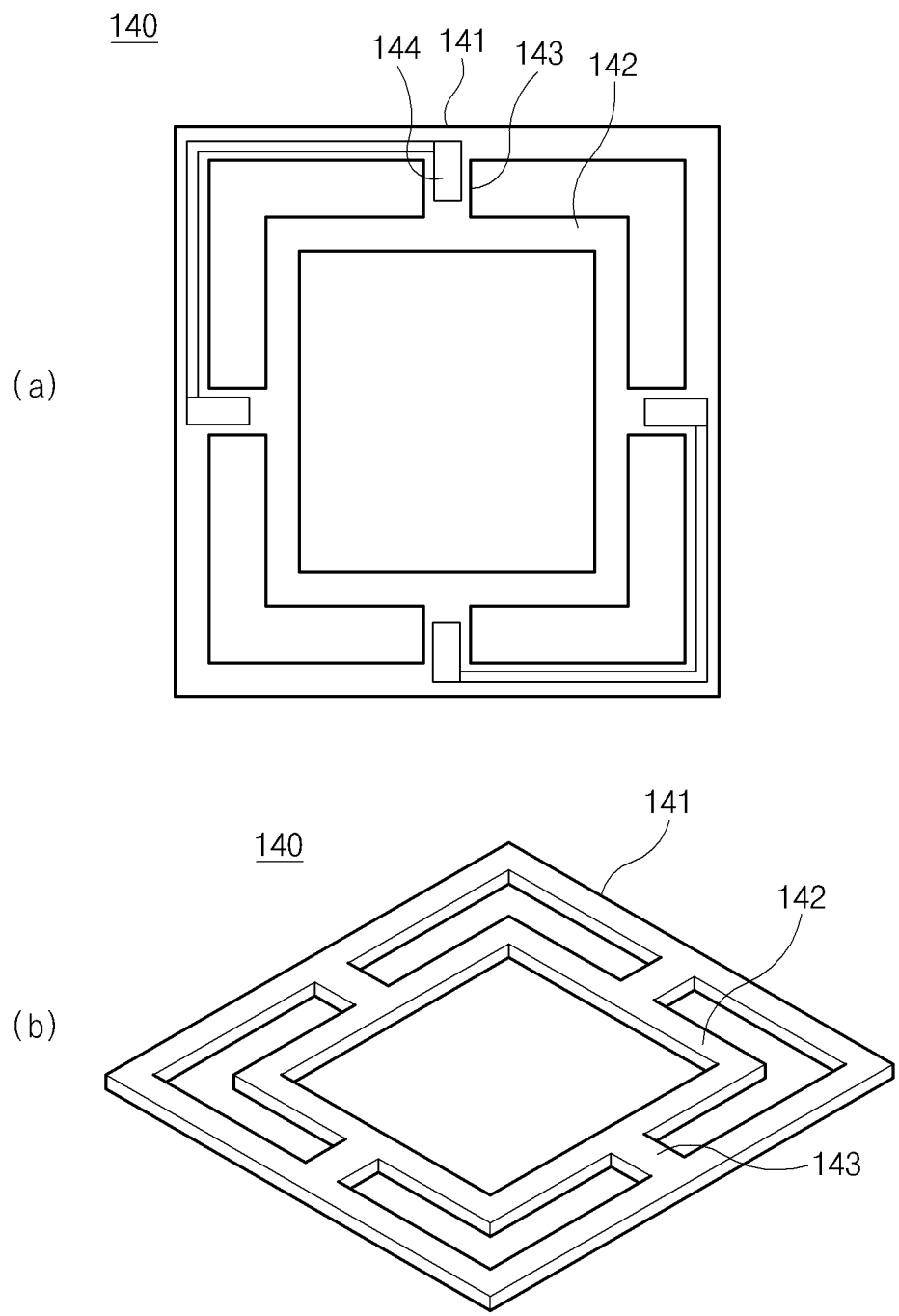
FIG. 4 is an exemplary diagram illustrating the silicon structure member of the torque sensor according to the exemplary embodiment of the present invention.

As illustrated in FIGS. 2 and 4, the silicon structure member 140 may be disposed on the elastic structure member 130 to detect the deformed amount of the elastic structure member 130. The silicon structure member 140 may be a rectangular plate shape and may include an external structure 141 having a squared edge shape, an internal structure 142 having a squared edge shape smaller than the external structure 141 and may be formed within the external structure 141, a second deformation generation portion 143 configured to connect the internal structure 132 with the external structure 141 to generate the deformation, and a deformation sensing unit 144 inserted into each second deformation generation portion 143 to detect the deformation of the second deformation generation portion 143.

Furthermore, the second deformation generation portions 143 may connect the sides of the external structure 141 to the sides of the internal structure 142, respectively, to form a total of four second deformation generation portions 143 in which the deformation sensing unit 144 may be formed.

Further, the deformation sensing unit 144, in an X-axis direction, may be interconnected with the deformation sensing unit 144 in a Y-axis direction to detect the deformed amount of the second deformation generation portion 143.

Moreover, the silicon structure member 140 bonded to the elastic structure member 130 may be formed to have a similar shape as the space portion 133 of the elastic structure member 130. In addition, the silicon structure member 140 may be bonded to the elastic structure member 130 to increase the physical performance of the silicon material, thereby increasing a range of the force and the torque that may be measured. Thus, the shape of the elastic structure member 130 and the shape of the silicon structure member 140 may be similar and the elastic structure member 130 may be bonded to the silicon structure member 140 to decrease the size of the force torque sensor.

Further, the second deformation generation portion 143 configured to generate deformation between the external structure 141 and the internal structure 142 may generate the deformation similarly to the first deformation generation portion 134 of the elastic structure member 130 and the deformation sensing units 144 disposed in the second deformation generation portion 143 may detect the deformation.

Moreover, the deformation sensing units 144 may be formed at the upper ends of the second deformation generation portions 143 each disposed in an east, west, south, north direction with respect to a center, by a semiconductor process and the deformation detection may be based on detecting a change in resistance of a piezoresistive material due to deformation, and the deformation sensing portions 140 may be manufactured by the semiconductor process, and therefore may be substantially accurately disposed at a position to detect the deformation, thereby reducing measurement error.

Figure 5:
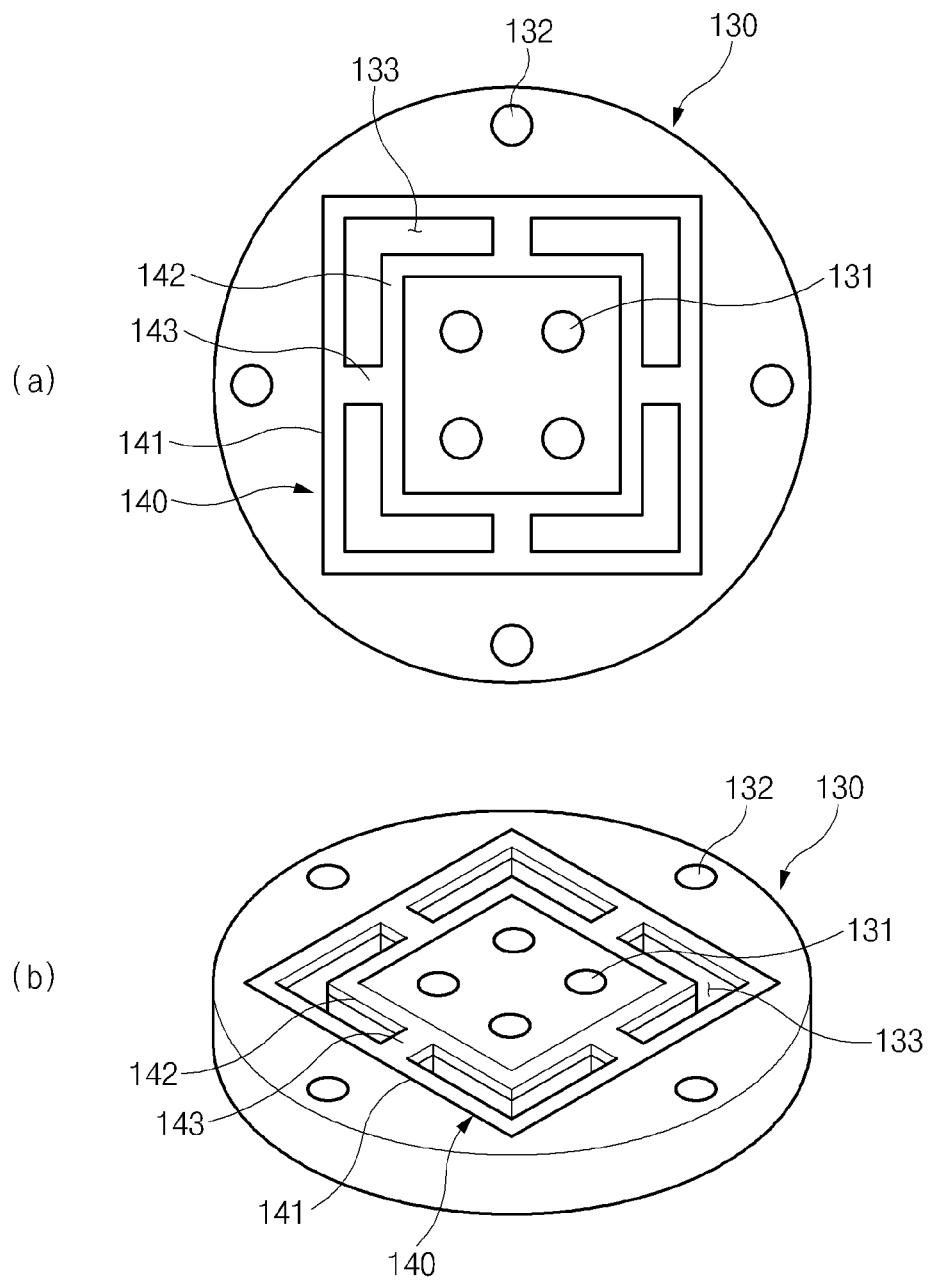
FIG. 5 is an exemplary diagram illustrating a state in which a silicon structure member is coupled with the elastic structure member of the torque sensor according to the exemplary embodiment of the present invention.

Furthermore, as illustrated in FIG. 5, the exemplary embodiment of the present invention may transfer the force and the torque generated from the interior of the torque sensor to the silicon structure member 140 through the elastic structure member 130 to accurately measure the deformed amount.

As set forth above, according to the exemplary embodiments of the present invention, the measurement precision of force and torque may be improved using a silicon structure member including a sensing unit and the size of the sensor may be decreased by bonding the elastic structure member to the silicon structure member, thereby increasing the marketability.

What is claimed is:
1. A torque sensor, comprising:
a cylindrical upper case having one open end;
an overload prevention member fixed to the cylindrical upper case to prevent overload;
a lower case configured to cover the open end of the cylindrical upper case;
an elastic structure member disposed on the lower case to detect deformation; a silicon structure member disposed on the elastic structure member to detect deformation, wherein the elastic structure member is a circular disk shape and includes:
an upper fastening portion and a lower fastening portion configured to lock the upper case to the lower case,
a plurality of space portions formed between the upper fastening portion and the lower fastening portion into which the silicon structure member is inserted, and
a first deformation generation portion disposed between the plurality of space portions and configured to detect deformation of the plurality of space portions; and
wherein the silicon structure member is a rectangular plate shape and includes:
an external structure inserted into each space portion,
an internal structure disposed in the external structure,
a second deformation generation portion configured to connect the internal structure to the external structure to generate deformation, and
a deformation sensing unit inserted into the second deformation generation portion to detect the deformation.

2. The torque sensor according to claim 1, wherein the deformation sensing unit includes a plurality of deformation sensing portions connected to each other.

* * * * *